United States Patent
Li et al.

(10) Patent No.: US 8,526,911 B2
(45) Date of Patent: Sep. 3, 2013

(54) METHODS AND APPARATUS FOR DETERMINING COSTS ASSOCIATED WITH SENDING COMMUNICATIONS

(75) Inventors: Yan Li, Beijing (CN); Zhimin Du, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 271 days.

(21) Appl. No.: 12/946,832

(22) Filed: Nov. 15, 2010

(65) Prior Publication Data

US 2011/0117880 A1 May 19, 2011

(30) Foreign Application Priority Data

Nov. 16, 2009 (CN) .......................... 2009 1 0221759

(51) Int. Cl.
*H04M 11/00* (2006.01)
(52) U.S. Cl.
USPC ............................ 455/406; 455/407; 455/408
(58) Field of Classification Search
USPC .................... 455/406, 407, 408, 414.1, 550.1
See application file for complete search history.

(56) References Cited

U.S. PATENT DOCUMENTS

| | | | |
|---|---|---|---|
| 6,587,550 B2 | 7/2003 | Council et al. | |
| 7,293,065 B2 | 11/2007 | Banister et al. | |
| 2004/0158540 A1 | 8/2004 | Zuo | |
| 2006/0286964 A1* | 12/2006 | Polanski et al. | 455/406 |
| 2007/0106734 A1 | 5/2007 | Mahajan et al. | |
| 2008/0065729 A1 | 3/2008 | Haas | |

FOREIGN PATENT DOCUMENTS

| | | |
|---|---|---|
| CN | 101500211 A | 8/2009 |
| EP | 1675332 A1 | 6/2006 |
| EP | 1675334 A1 | 6/2006 |
| EP | 2187608 A2 | 5/2010 |
| WO | WO02071774 A1 | 9/2002 |
| WO | WO03094494 A2 | 11/2003 |
| WO | WO2005074443 A2 | 8/2005 |
| WO | WO2006105301 A2 | 10/2006 |
| WO | WO2007101149 A2 | 9/2007 |

OTHER PUBLICATIONS

International Search Report and Written Opinion—PCT/US2010/056901, International Search Authority—European Patent Office—Mar. 21, 2011.

* cited by examiner

*Primary Examiner* — Kathy Wang-Hurst
(74) *Attorney, Agent, or Firm* — Abdollah Katbab

(57) ABSTRACT

Methods and apparatus for determining a charge for a communication with one or more devices may include identifying a communication from a first device to a second device. The methods and apparatus may further include determining if the first device has a relationship with the second device by identifying another communication between the first device and the second device prior to the time of the communication, and determining a charge amount based upon the determining.

42 Claims, 9 Drawing Sheets

METHODS AND APPARATUS FOR DETERMINING COSTS ASSOCIATED WITH SENDING COMMUNICATIONS

CLAIM OF PRIORITY UNDER 35 U.S.C. §119

The present application for patent claims priority to Chinese Patent Application No. 200910221759.1 entitled "User Connection based Anti-spam Method" filed Nov. 16, 2009, and assigned to the assignee hereof and hereby expressly incorporated by reference herein.

BACKGROUND

In today's world, wireless communication systems are widely deployed to provide various types of content, including voice, video, music, text and data, for example. Wireless devices, such as cellular telephones or handheld devices having wireless connection capability are deployed leveraging the wireless communication system by users for communicating and interacting with each other. With the progress and popularization of communication technologies and applications, spam messages (e.g., junk short message service (SMS) messages, junk multimedia messaging service (MMS) messages, and junk email message, among others) gradually become more of a nuisance to the users of wireless devices, network operators, and relevant supervisory authorities. Sending spam messages can be easy and can costs very little. Therefore, the proliferation of spam message has become a focus of user complaints.

Network operators typically exploit filtering technologies, such as key words, sending frequency and group-sending matching to block spam messages on the way, rather than stopping spam messages from the source. In general, the sender of a spam message is usually a stranger to the receiver. In addition, sending a spam message typically costs less, e.g., spammers often use the accounts that subscribe special discount tariff package. Thus, there remains a need for anti-spam mechanisms that utilizes user connection information and adopts differential tariffs to prevent the sending of spam messages from the source.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for determining a charge for a communication with one or more devices. The method may include identifying a communication from a first device to a second device. In addition, the method may include determining if the first device has a relationship with the second device by identifying another communication between the first device and the second device prior to the time of the communication. The method may also include applying a first charge amount for the communication if the relationship is determined. The method may further include applying a second charge amount for the communication if the relationship is not determined.

Another aspect relates to at least one processor configured to determine a charge for a communication with one or more devices. The processor may include a first module for identifying a communication from a first device to a second device. The processor may also include a second module for determining if the first device has a relationship with the second device by identifying another communication between the first device and the second device prior to the time of the communication. The processor may further include a third module for applying a first charge amount for the communication if the relationship is determined. In addition, the processor may include a fourth module for applying a second charge amount for the communication if the relationship is not determined.

Yet another aspect relates to a computer program product for determining a charge for a communication with one or more devices. The computer program product may include a computer-readable medium including at least one instruction executable by the computer to identify a communication from a first device to a second device. The computer-readable medium may also include at least one instruction executable by the computer to determine if the first device has a relationship with the second device by identifying another communication between the first device and the second device prior to the time of the communication. In addition, the computer-readable medium may include at least one instruction executable by the computer to apply a first charge amount for the communication if the relationship is determined. Furthermore, the computer-readable medium may include at least one instruction executable by the computer to apply a second charge amount for the communication if the relationship is not determined.

Another aspect relates to an apparatus. The apparatus may include means for identifying a communication from a first device to a second device. In addition, the apparatus may include means for determining if the first device has a relationship with the second device by identifying another communication between the first device and the second device prior to the time of the communication. The apparatus may further include means for applying a first charge amount for the communication if the relationship is determined. Moreover, the apparatus may include means for applying a second charge amount for the communication if the relationship is not determined.

Still another aspect relates to an apparatus for determining a charge for a communication with one or more devices. The apparatus may include a communication receiving component operable to identify a communication from a first device to a second device. The apparatus may also include a communication relationship determiner operable to determine if the first device has a relationship with the second device by identifying another communication between the first device and the second device prior to the time of the communication. The apparatus may additionally include a billing component operable to apply a first charge amount for the communication if the relationship is determined. The apparatus may also include the billing component operable further to apply a second charge amount for the communication if the relationship is not determined.

Another aspect relates to a method for receiving a charge at a wireless device for sending a communication to a second device. The method may include sending a communication from a wireless device to a second device. In addition, the method may include receiving a first charge for sending the communication if a relationship exists between the wireless device and the second device, wherein the relationship is determined by identifying whether another communication occurred between the wireless device and the second device prior to sending the communication. The method may further include receiving a second charge for sending the communication if a relationship does not exists between the wireless device and the second device, wherein the relationship is determined by identifying whether another communication occurred between the wireless device and the second device prior to sending the communication.

Yet another aspect relates to at least one processor configured to receive a charge at a wireless device for sending a communication to a second device. The processor may include a first module for sending a communication from a wireless device to a second device. The processor may also include a second module for receiving a first charge for sending the communication if a relationship exists between the wireless device and the second device, wherein the relationship is determined by identifying whether another communication occurred between the wireless device and the second device prior to sending the communication. Moreover, the processor may include a third module for receiving a second charge for sending the communication if a relationship does not exists between the wireless device and the second device, wherein the relationship is determined by identifying whether another communication occurred between the wireless device and the second device prior to sending the communication.

Another aspect relates to a computer program product for receiving a charge at a wireless device for sending a communication to a second device. The computer program product may include a computer-readable medium including at least one instruction executable by the computer to send a communication from a wireless device to a second device. In addition, the computer-readable medium may include at least one instruction executable by the computer to receive a first charge for sending the communication if a relationship exists between the wireless device and the second device, wherein the relationship is determined by identifying whether another communication occurred between the wireless device and the second device prior to sending the communication. Furthermore, the computer-readable medium may include at least one instruction executable by the computer to receive a second charge for sending the communication if a relationship does not exists between the wireless device and the second device, wherein the relationship is determined by identifying whether another communication occurred between the wireless device and the second device prior to sending the communication.

Still another aspect relates to an apparatus. The apparatus may include means for sending a communication from a wireless device to a second device. In addition, the apparatus may include means for receiving a first charge for sending the communication if a relationship exists between the wireless device and the second device, wherein the relationship is determined by identifying whether another communication occurred between the wireless device and the second device prior to sending the communication. The apparatus may also include means for receiving a second charge for sending the communication if a relationship does not exists between the wireless device and the second device, wherein the relationship is determined by identifying whether another communication occurred between the wireless device and the second device prior to sending the communication.

Another aspect relates to an apparatus for receiving a charge at a wireless device for sending a communication to a second device. The apparatus may include a communication request component operable to send a communication from a wireless device to a second device. The apparatus may further include the communication request component is further operable to receive a first charge for sending the communication if a relationship exists between the wireless device and the second device, wherein the relationship is determined by identifying whether another communication occurred between the wireless device and the second device prior to sending the communication. Moreover, the apparatus may include the communication request component is further operable to receive a second charge for sending the communication if a relationship does not exists between the wireless device and the second device, wherein the relationship is determined by identifying whether another communication occurred between the wireless device and the second device prior to sending the communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for determining a charge, such as a payment, for sending one or more communications to one or more devices. The charge for sending the communication may be based upon whether a relationship previously existed between the devices. In addition, the charge for sending the communication may be based upon, for example, whether a subsequent relationship is established between the communication devices within a period of time after the initial communication is sent.

If a relationship exists between the communication devices or is subsequently established, then the charge for sending the communication may be lower than the charge for sending a communication when a relationship does not exists. Thus, the described aspects may adopt different tariffs for sending communications based upon whether a relationship exists between the communication devices. Adopting different tariffs may discourage and/or punish the sending of unsolicited communications, e.g., spam messages and/or mass communications.

Figure 1:
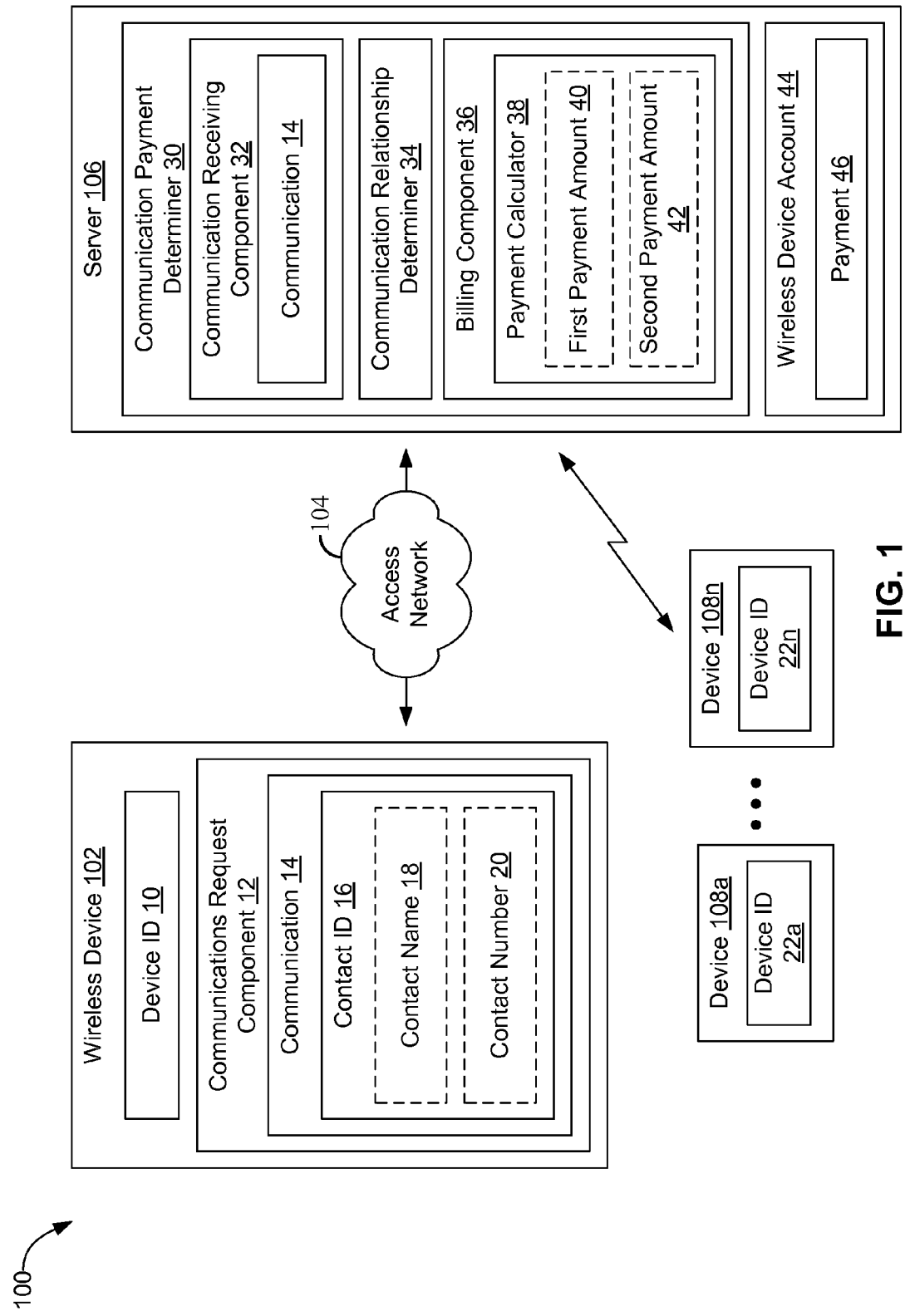
FIG. 1 is an illustration of a connectivity system in accordance with an aspect.

Turning now to FIG. 1, illustrated is an example connectivity system 100 that includes one or more wireless devices 102, 108 communicating through one or more access networks 104 with one or more servers 106. Wireless devices 102, 108 may include any mobile or portable computing or communications device, such as a cellular device, that may connect to an access network 104. Wireless devices 102, 108 may be, for example, a cellular telephone, a navigation system, a computing device, a camera, a PDA, a music device, a gaming device or a handheld device having wireless connection capability, among other devices. Server/computing device 106 may include any mobile or fixed computing device connected to a network. Sever/computing device 106 may include, but is not limited to, a computing device, a server, a cellular telephone, a camera, a PDA, a music device, a gaming device, a navigation system, or a handheld device having wireless connection capability, among other devices. Furthermore, access network 104 may provide one or more types of communication connections, such as any type of wireless airlink, to wireless devices 102, 108 and server 106.

Server 106 may include a communication payment determiner 30 operable for determining costs associated with sending and/or receiving one or more communications 14. Communications 14 may include, but are not limited to, a telephone call, a video conferencing call, an Internet Protocol session, such as a SKYPE™ session, a voice over internet protocol (IP) call, a short message service (SMS) message, a multimedia messaging service (MMS) message, an instant messaging (IM) service message, a chat or net-meeting related connection, a video, music, or data transfer, among other communications.

Communication payment determiner 30 may also include a communication receiving component 32 operable to receive one or more communications 14 sent from one or more wireless devices 102 to one or more wireless devices 108. In addition, communication receiving component 32 may be operable to receive one or more communications 14 sent from wireless device 108 to wireless device 102. For example, communication receiving component 32 may communicate via access network 104 with communication request component 12 of wireless device 102 to receive communications 14 sent from wireless device 102 to one or more wireless devices 108.

In addition, communication request component 12 of wireless device may send contact identification (ID) 16 to communication receiving component 32. Contact ID 16 may identify the communication device receiving the communication 14, e.g., wireless device 108. In addition, contact ID 16 may include, but is not limited to, a contact name 18 and/or a contact number 20, among other forms of identifying the destination for communication 14. It should be appreciated the one or more wireless devices 102, 108 may be sending one or more communications 14 to server 106. Thus, communication receiving component 32 may receive and/or send one or more communications 14 from one or more wireless devices 102, 108.

In an aspect, communication payment determiner 30 may determine the costs associated with sending a communication based upon whether a relationship exists between the originating device of the communication and the destination device of the communication. A relationship may include, but is not limited to, answering an interactive communication (e.g., voice telephone calls, video telephone calls), initiating a communication with the sender (e.g., sending a voice telephone call and/or a video telephone call, or signing up for a communication list, such as an e-mail and/or SMS message list), or the sender is classified as a special user (e.g., an authorized public information promulgator), among other relationships For example, communication receiving component 32 may communicate with communication relationship determiner component 34 to determine whether a relationship exists between the originating device (e.g., wireless device 102) that sends communication 14 and the destination device (e.g., wireless device 108) that receives communication 14. Communication receiving component 32 may forward the originating ID (e.g., device ID 10 of wireless device 102) and the destination ID (e.g., contact ID 16 for the destination device) to the communication relationship determiner 34. Communication relationship determiner 34 may use the originating ID and the destination ID to determine whether a relationship exists between the originating device and the destination device.

Figure 2:
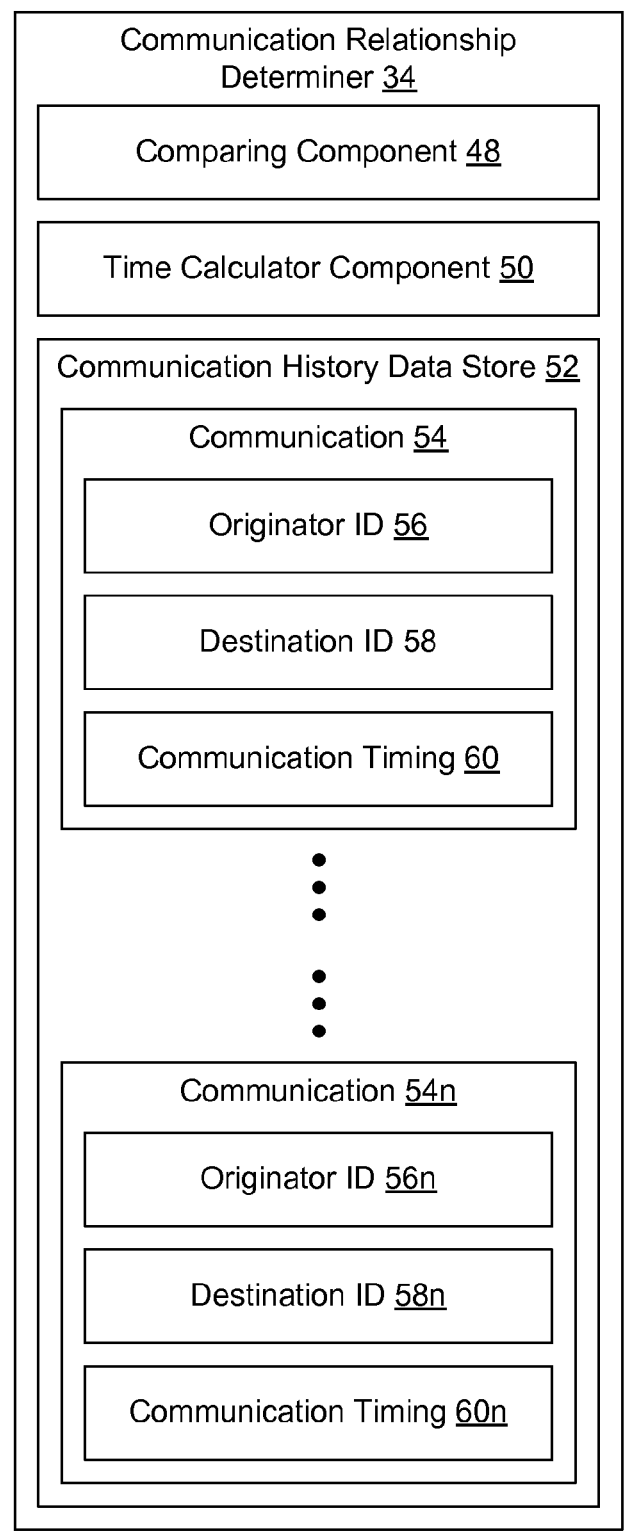
FIG. 2 is an illustration of an example communication relationship determiner in accordance with another aspect.

Turning now to FIG. 2, illustrated is an example communication relationship determiner component 34 in accordance with an aspect. Communication relationship determiner component 34 may include a communication history data store 52 operable for storing one or more communications 54 that have been sent and/or received by one or more wireless devices 102, 108 (FIG. 1). Communication history data store 52 may also include for each communication 54, the originator ID 56, the destination ID 58, and the communication timing 60, among other communication information. The originator ID 56 may include, for example, the device ID of the wireless device that originated the communication 54. The destination ID 58 may include, for example, the device ID of the destination device that received the communication 54. In addition, the communication timing 60 may include, but is not limited to, the date and/or time when the communication 54 occurred between the originating device 56 and the destination device 58. Thus, for each communication 54 from one or more wireless devices 102 and/or communication devices 108, the communication history data store 52 may track which devices have been communicating with each other and when the communications occurred. Therefore, server 106 may maintain a single communication history data store 52 which contains all the communications 54 sent from each of the wireless devices in the communication system.

Communication relationship determiner component 34 may also include a comparing component 48 operable for comparing the originating ID of communication 14 with the originator IDs 56 and/or destination IDs 58 stored in communication history data store 52 to determine whether a relationship exists between the originating device and the destination device. Thus, if wireless device 102 sends a communication 14 to a destination device 108 and the device ID 10 of wireless device 102 matches with an originator ID 56 and/or destination ID 58 of a communication 54 associated with destination device 108 stored in communication history data store 52, then comparing component 48 may determine that a relationship exists between wireless device 102 and the destination device 108.

Communication relationship determiner 24 may further include a time calculator component 50 operable for calculating a time period during which a communication 54 should have occurred in order to have a relationship. For example, the time calculator component 50 may determine that communications 54 that occurred within the past three months may indicate that a relationship exists between the devices. In addition, the time calculator component 50 may determine that if a communication 14 occurs within the next three months or a designated period of time between two devices, then a relationship may be established between the devices. Thus, the comparing component 48 may interface with the time calculator component 50 to determine whether the communication timing 60 stored in the communication history data store 52 is within the time allocated for a relationship to exist.

Referring back to FIG. 1, communication payment determiner 30 may further include a billing component 36 operable for determining the costs associated with sending and/or receiving one or more communications 14. In an aspect, the costs for sending and/or receiving one or more communications 14 may be based upon whether a relationship exists between the originating device (e.g., wireless device 102) and the destination device (e.g., wireless device 108). Billing component 36 may interface with communication relationship determiner 34 for determining whether a relationship exists between the devices. Billing component 36 may also include a payment calculator 38 for calculating the costs associated with sending the one or more communications 14. Payment calculator 38 may include a first payment amount 40 if a relationship exists between the originating device and the destination device and a second payment amount 42 if a relationship does not exists between the originating device and the destination device. Thus, it should be appreciated that the billing component 36 may determine various rates for sending one or more communications 14 based upon, for example, but not limited to, whether a relationship exists between the originating device and/or destination device.

In addition, server 106 may include a wireless device account 44 which may interface with the billing component 36 to determine the payment 46 to wireless device 102. Thus, the wireless device account 44 may be debited and/or credited with the costs determined by the billing component 36.

Figure 3:
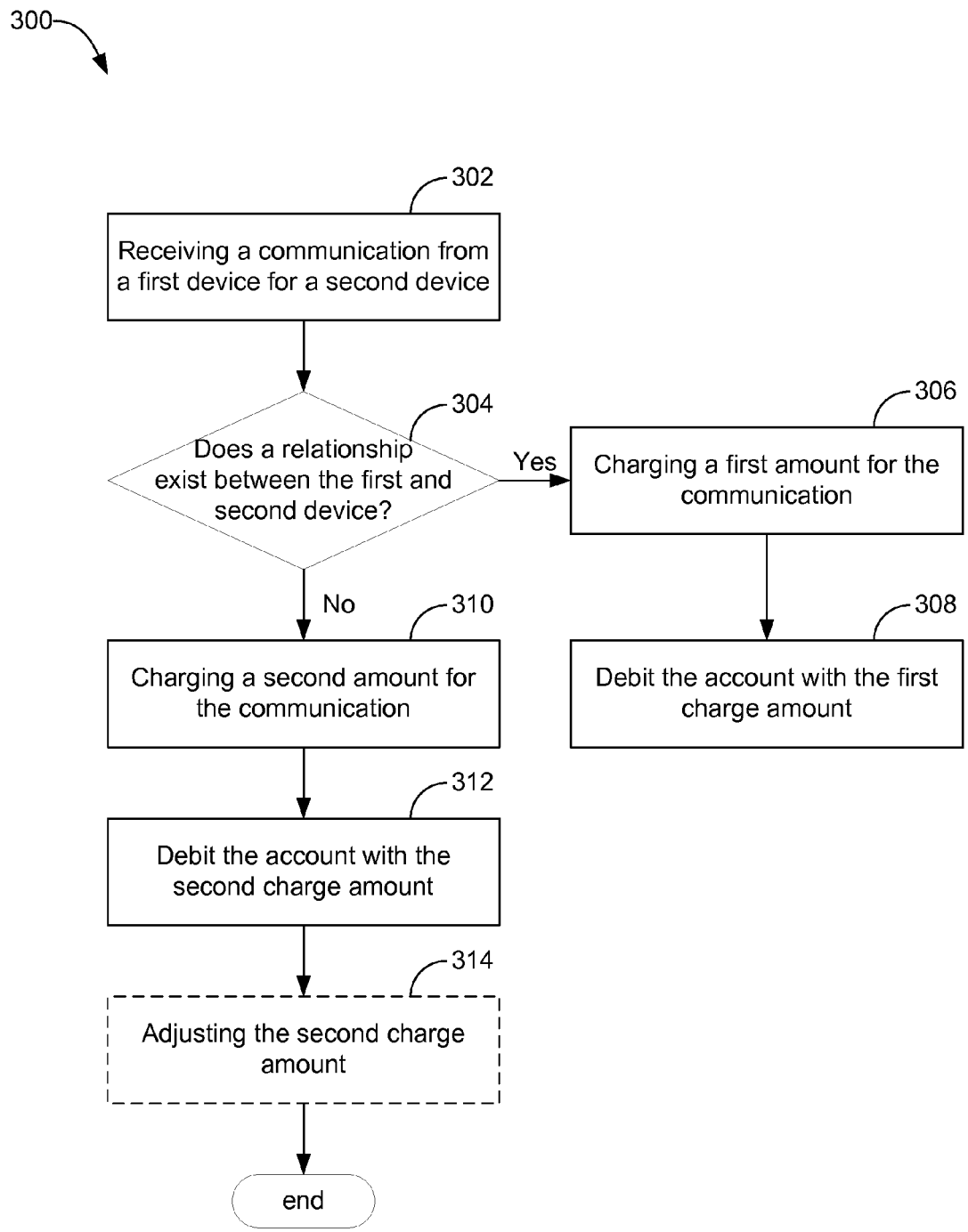
FIG. 3 is a flow chart illustrating a method for determining a charge for sending communications in accordance with yet another aspect.

Referring now to FIG. 3, a method 300 for determining a charge for sending a communication in accordance with an aspect includes, at 302, receiving a communication from a first device for a second device. For example, an originating device, e.g., wireless device 102 (FIG. 1), may send a communication to a destination device, e.g., wireless device 108 (FIG. 1). As discussed above, a communication may include, but is not limited to, a telephone call, a video conferencing call, an Internet Protocol session, such as a SKYPE™ session, a voice over internet protocol (IP) call, a short message service (SMS) message, a multimedia messaging service (MMS) message, an instant messaging (IM) service message, a chat or net-meeting related connection, a video, music, or data transfer, among other communications.

Next, at 304, the method may include determining whether a relationship exists between the first and second device. A relationship may include, but is not limited to, answering an interactive communication (e.g., voice telephone calls, video telephone calls), initiating a communication with the sender (e.g., sending a voice telephone call and/or a video telephone call, or signing up for a communication list, such as an e-mail and/or SMS message list), or the sender is classified as a special user (e.g., an authorized public information promulgator), among other relationships. Examples of determining a relationship are described below in FIG. 4.

Figure 4:
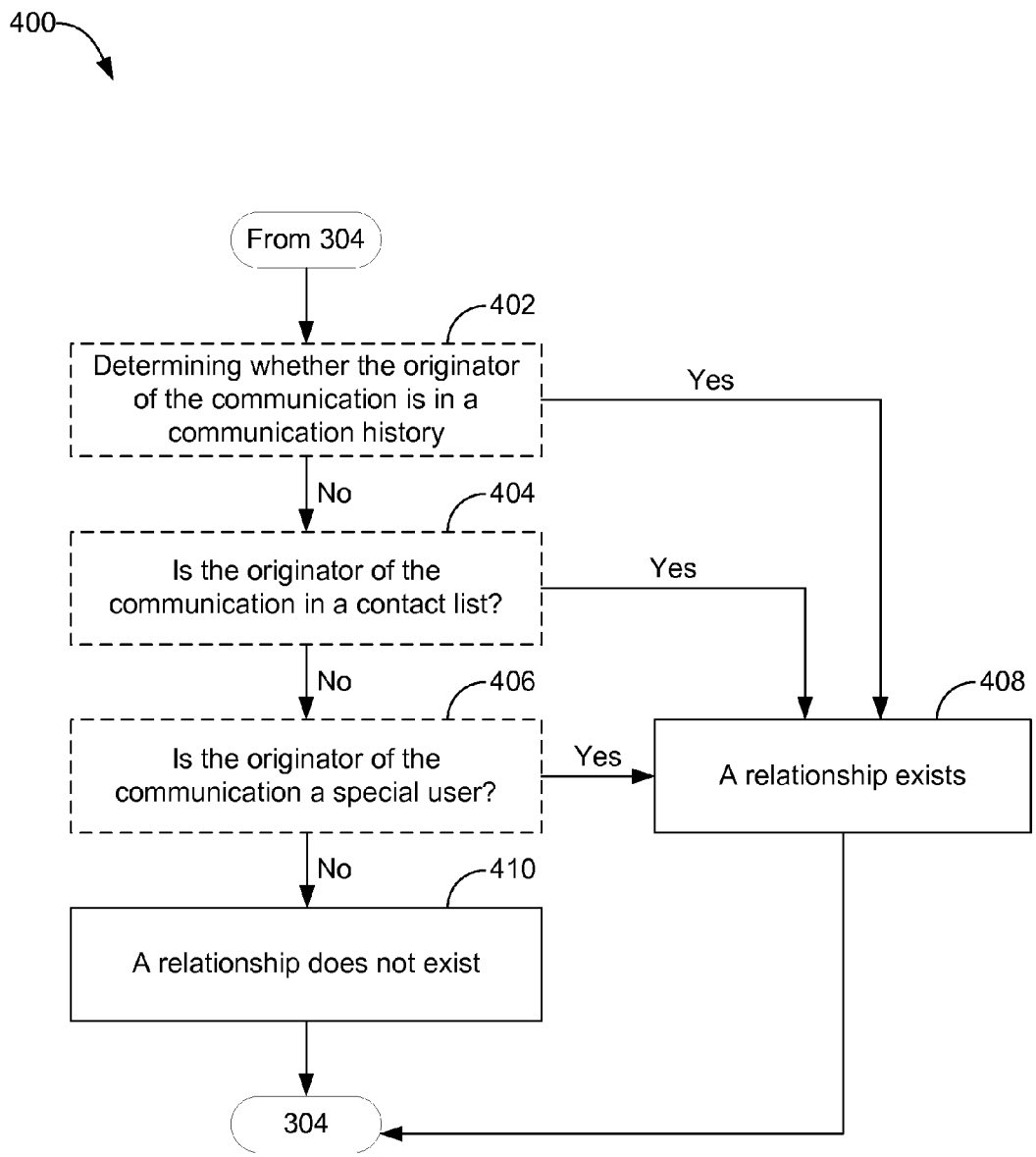
FIG. 4 is a flow chart illustrating a method for determining a relationship between communication devices in accordance with still another aspect.

Turning now to FIG. 4, a method 400 for determining a relationship between communication devices in accordance with an aspect includes, at 402, determining whether the originator of the communication is in a communication history data store, e.g., a white list or a communication log stored by the network operator. The white list may include, for example, a list of communication devices that are approved to receive the communication from the originator or initiate communication to the originator and/or a list of previous communications between the communication devices. If the originator of the communication is in the communication history data store, then at 408, the method may include determining a relationship exists between the originating device and the destination device. For example, communication history data store 52 (FIG. 2) may have a record of an interactive communication that wireless device 108 answered from wireless device 102 within the past month. Therefore, communication relationship determiner component 34 may use the information stored in the communication history data store 52 to determine that a relationship exists between the wireless devices 102 and 108.

In addition, communication relationship determiner component 34 may search billing records that corresponding to the wireless devices 102 and/or 108 to determine whether a previous communication occurred between the wireless devices. If the billing records indicate that a previous communication occurred between wireless devices 102 and 108, then communication relationship determiner component 34 may determine that a relationship exists between the wireless devices.

Next, at 404, the method may also include determining whether the originator of the communication is stored in a contact list of the destination device. If the originating device is stored in the contact list, then at 408, the method may include determining that a relationship exists between the originating device and the destination device. For example, if wireless device 102 sends a communication to wireless device 108, and wireless device 102 is stored in the contact list on wireless device 108, e.g., an address book stored, communication relationship determiner 34 may determine that a relationship exists between the wireless devices 102 and 108.

At 406, the method may further include determining whether the originating device is classified as a special user. A special user may include, for example, a list of preferred contacts, an authorized public information promulgator, or an emergency system broadcaster, among other special users. If the originating device is determined to be a special user, then at 408, the method may include determining that a relationship exists between the originating device and the destination device.

If the originating device is not part of a communication history data store (402), stored in a contact list (404), or classified as a special user (406), then at 410, the method may include determining that a relationship does not exists.

Referring back to FIG. 3, if a relationship does exist, at 306, the method may include charging a first amount for the communication. The first amount may be, for example, the typical charge for sending communications, a discount rate, or an amount accounted into a monthly tariff rate, among other amounts. It should also be appreciated that the first amount may be a credit which allows the communication to occur free of charge. Thus, server 106 (FIG. 1) may charge wireless device 102 a discounted rate for sending communication 14 (FIG. 1) to a wireless device 108 that wireless device 102 has an existing relationship with. At 308, the method may include debiting an account with the first charge amount. For example, server 106 may debit the wireless device account 44 (FIG. 1) with the first charge amount for sending communication 14.

Alternatively, if a relationship does not exist, at 310, the method may include charging a second amount for the communication. The second amount may be, for example, a punitive rate, such as an upper limit of the normal rate allowed by law and/or a regulation, to discourage the sending of unsolicited messages. Unsolicited messages may include, for example, sending communications to destination devices that do not have a relationship with the originating device, or mass communications (e.g., spam messages or mass marketing and/or advertising). Thus, the second rate may prevent the sending of unsolicited messages at the source by charging a higher rate for the communication. For example, server 106 (FIG. 1) may charge wireless device 102 a higher rate for sending communication 14 (FIG. 1) to destination devices that wireless device 102 does not have a relationship with. At 312, the method may include debiting the account with the second charge amount. For example, server 106 may debit wireless device account 44 with the second charge amount for sending communication 14.

In an optional aspect, at 314, the method may include adjusting the second charge amount. For example, the second charge amount may be adjusted if a subsequent relationship is established between the communication devices within a period of time after the initial communication is sent, as discussed below in FIG. 5.

Figure 5:
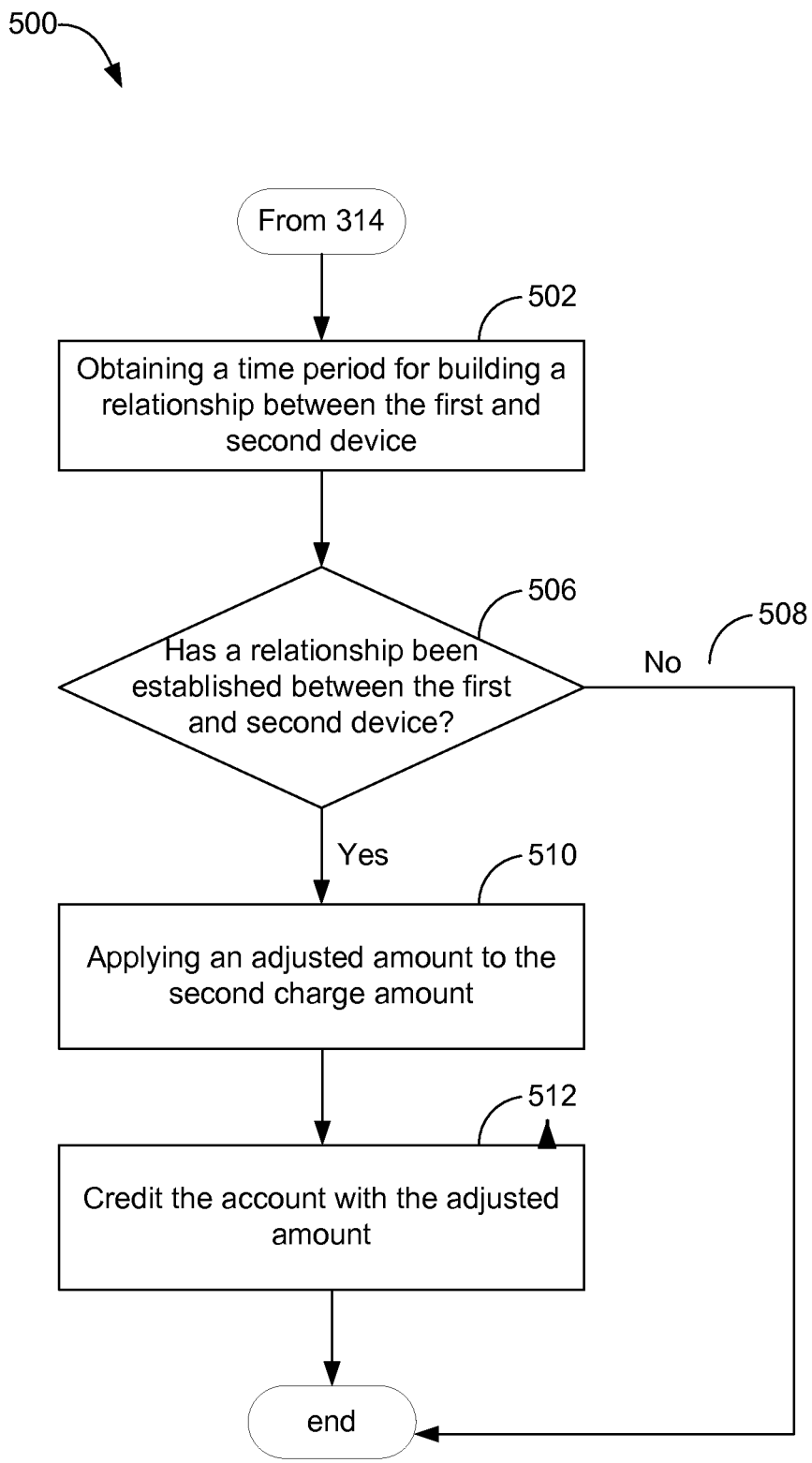
FIG. 5 is a flow chart illustrating a method for adjusting a charge for sending communications in accordance with another aspect.

Referring now to FIG. 5, a method 500 for adjusting a charge for a communication in accordance with an aspect includes, at 502, obtaining a time period for building and/or establishing a relationship between the first and second devices. The time period may be a set number, e.g., one month, or a configurable number.

Next, at 506, the method may include determining whether a relationship has been established between the first and second device. For example, if the destination device sends a communication to the originating device, such as answering an interactive communication and/or initiating a communication with the originating device, within the period of time set by the operator, then a relationship may be established between the originating and destination devices. It should be appreciated that the method described above in FIG. 4 may also be used for determining whether relationship was established between the originating and destination device within the time period. For example, if the destination device adds the originating device to a contact list of the destination device, then a relationship may be established between the originating device and the destination device.

If a relationship is not established between the first and second devices, then at 508, the method may end. Thus, wireless device 102 may be charged a higher cost for sending an unsolicited message, e.g., a message to a destination device that does not have a relationship with wireless device 102.

If a relationship is established between the first and second devices within the time period allocated, at 510, the method may include applying an adjusted amount to the second charge amount. For example, if wireless device 102 (FIG. 1) and communication device 108 (FIG. 1) establish a relationship within a month, then an adjusted amount may be applied to the second charge amount. The adjusted amount may be, but is not limited to, the difference between the second and first charge amount (e.g., the difference between the upper limit of the normal rate and the discounted rate for the user). Next, at 512, the method may include crediting the account with the adjusted amount. For example, server 106 may credit the wireless device account 44 with the adjusted amount. Therefore, when the originating device receives a refund with the adjust amount after a relationship is established, the originating device may be charged the discounted rate for sending the communication.

Figure 6:
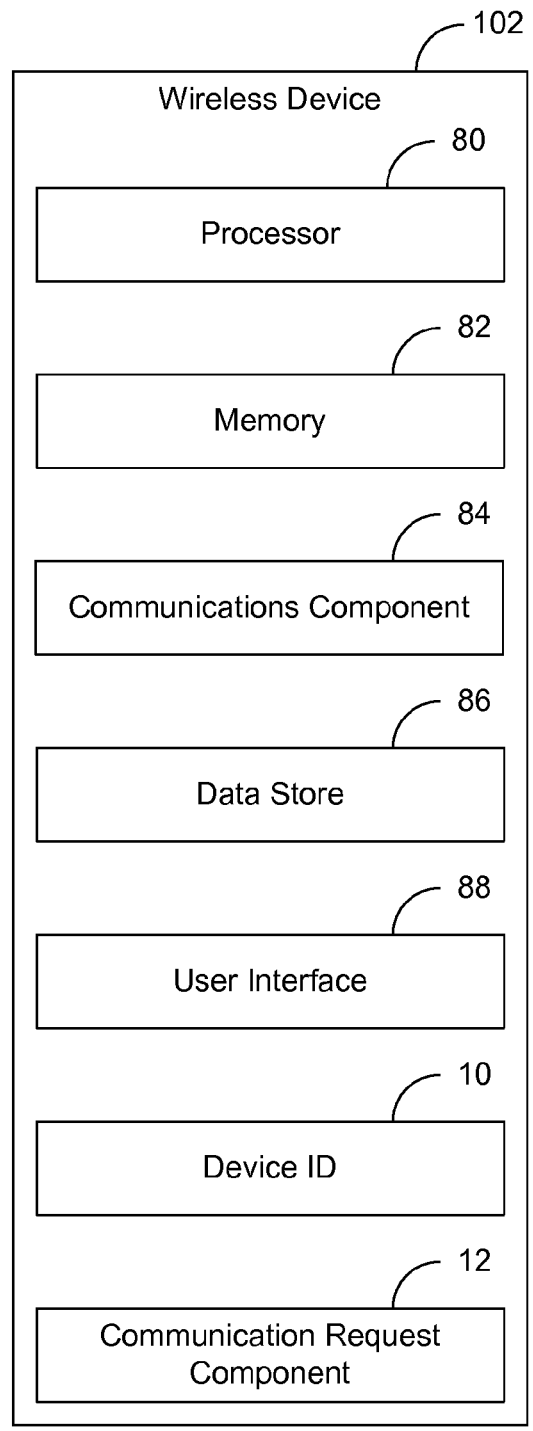
FIG. 6 is a an example wireless device operable within the connectivity system in accordance with an aspect.

Referring now to FIG. 6, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device may also include a communication request component 12 (FIG. 1) operable to request that one or more communications be sent to one or more parties. Communication request component 12 may interface with communications component 84 to send and/or receive the one or more communications.

Figure 7:
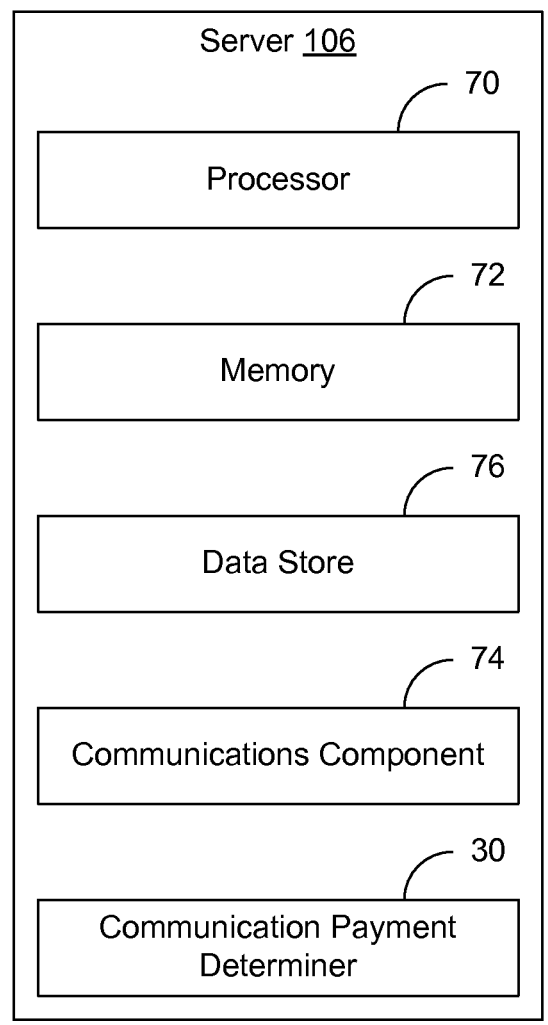
FIG. 7 is an example sever device operable within the connectivity system in accordance with yet another aspect.

Referring now to FIG. 7, illustrated is an example sever device 106 operable within the connectivity system in accordance with yet another aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing. Server 106 may also include a communication payment determiner 30 operable to determine the cost associated with sending one or more communications.

Figure 8:
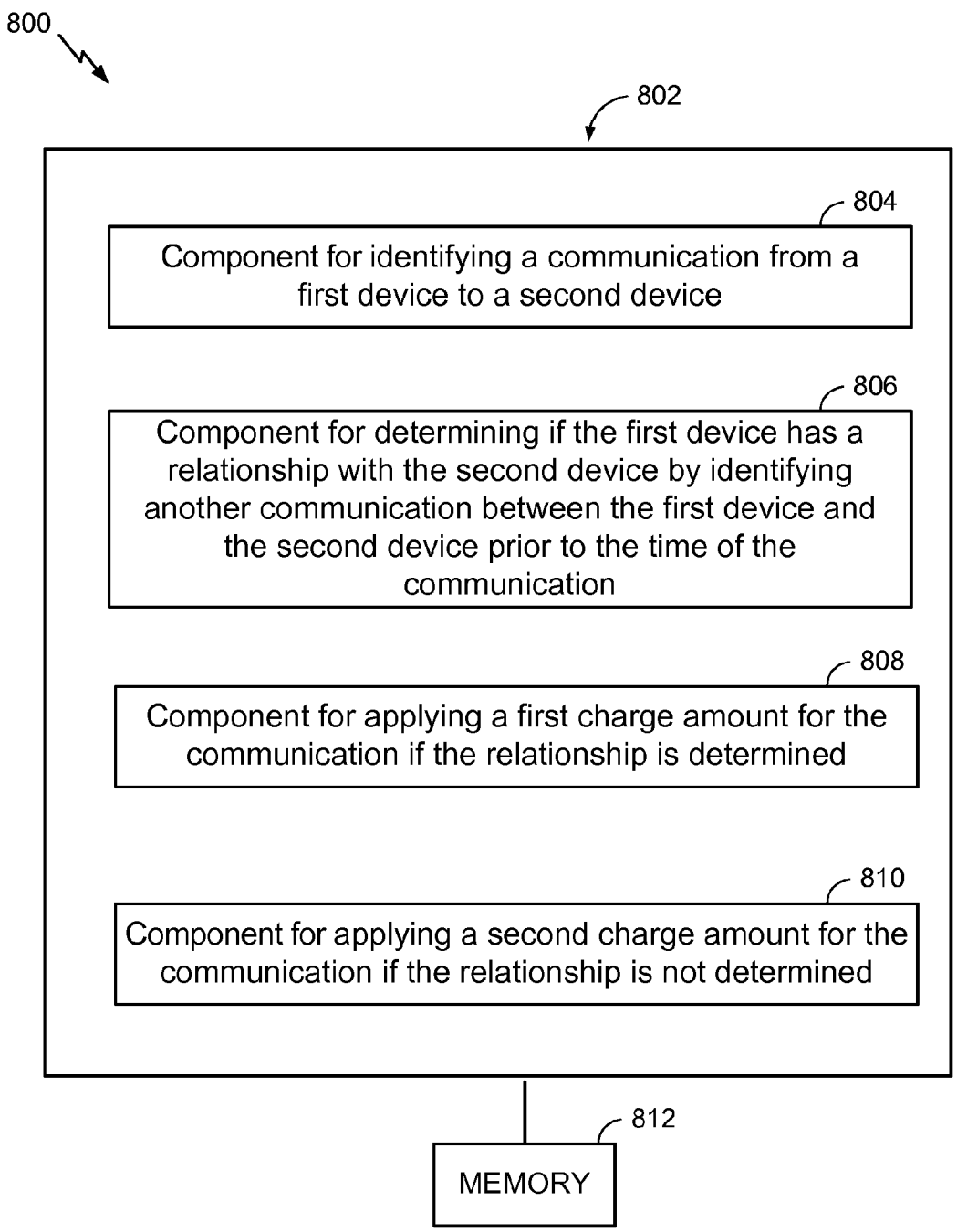
FIG. 8 is an illustration of an example system that facilitates determining a payment for a communication in accordance with still another aspect.

Turning now to FIG. 8, illustrated is a system 800 configured to determine a payment for a communication in accordance with an aspect. For example, system 800 can reside at least partially within a transmitter, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that facilitate determining a payment for a communication. For instance, logical grouping 802 may include component 804 for identifying a communication from a first device to a second device. Further, logical grouping 802 may comprise component 806 for determining if the first device has a relationship with the second device by identifying another communication between the first device and the second device prior to the time of the communication. In addition, logical grouping 802 may include component 808 for applying a first charge amount for the communication if the relationship is determined. Logical grouping 802 may also include component 810 for applying a second charge amount for the communication if the relationship is not determined. Additionally, system 800 can include a memory 812 that retains instructions for executing functions associated with electrical components 804, 806, 808, and 810. While shown as being external to memory 812, it is to be understood that one or more of electrical components 804, 806, 808, and 810 can exist within memory 812.

Figure 9:
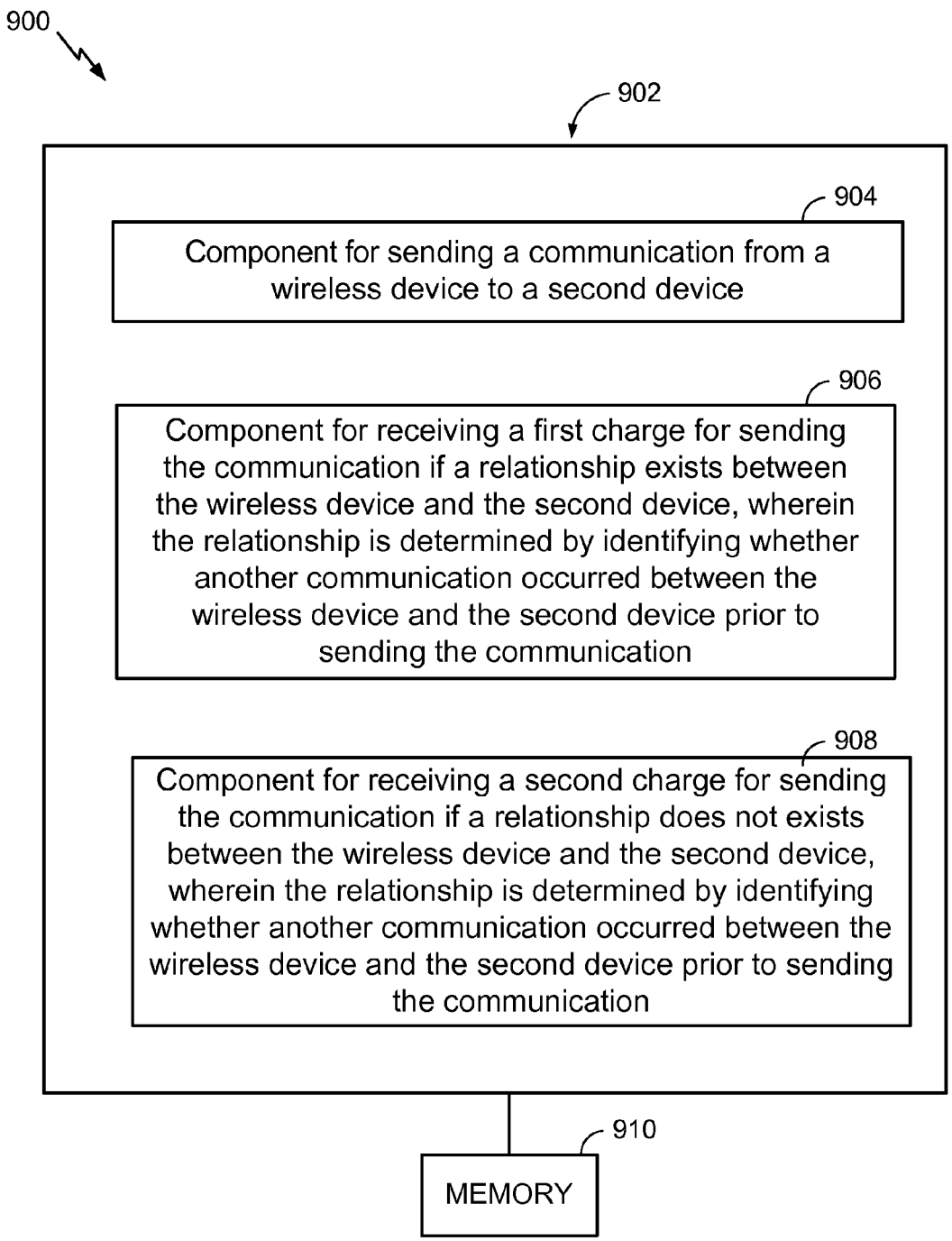
FIG. 9 is an illustration of an example system that facilitates receiving a charge for sending a communication in accordance with another aspect.

Referring now to FIG. 9, illustrated is a system 900 configured to receive a charge for sending a communication. For example, system 900 can reside at least partially within a transmitter, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that facilitate receiving a charge on a wireless device. For instance, logical grouping 902 may include component 904 for sending a communication from a wireless device to a second device. Further, logical grouping 902 may comprise component 906 for receiving a first charge for sending the communication if a relationship exists between the wireless device and the second device, wherein the relationship is determined by identifying whether another communication occurred between the wireless device and the second device prior to sending the communication. In addition, logical grouping 902 may include component 908 for receiving a second charge for sending the communication if a relationship does not exists between the wireless device and the second device, wherein the relationship is determined by identifying whether another communication occurred between the wireless device and the second device prior to sending the communication. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

One variation of the described aspects may be applying the described methods and apparatus to both postpaid and prepaid users, and in particular to users that subscribe to message packages with discounted tariffs. It should be appreciated that since the difference between the penalty rate and the usual rate may be refunded later, a pre-paid subscriber should be allowed for a certain amount of overdraft. Thus, adjustments may be made to adjust the real-time deduction mechanisms for the prepaid users to allow the certain amount of overdraft.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of determining a charge for a communication with one or more devices, comprising:
   identifying a communication from a first device to a second device;
   determining if the first device has a relationship with the second device by identifying another communication between the first device and the second device prior to the time of the communication, wherein determining if the first device has the relationship with the second device further comprises determining whether the relationship is established within a configurable time period from a time of the communication;
   applying a first charge amount for the communication if the relationship is determined; and
   applying a second charge amount for the communication if the relationship is not determined; wherein
   applying the first charge amount for the communication if the relationship is determined further comprises initially applying an initial charge amount and subsequently applying an adjustment amount after the relationship is determined, wherein the first charge amount is less than the second charge amount.

2. The method of claim 1, wherein identifying the another communication is based upon communications stored on a connection list.

3. The method of claim 2, wherein the connection list is generated by a network based upon communications that occur over the network.

4. The method of claim 1, wherein identifying the another communication further comprises at least one of identifying a response from the second device to the first device, or identifying an origination by the second device to the first device.

5. The method of claim 1, wherein identifying the another communication further comprises searching billing records corresponding to at least one of the first device or the second device to identify the another communication.

6. The method of claim 1, wherein initially applying the initial charge amount further comprises initially applying the second charge amount.

7. The method of claim 1, wherein the first charge amount is less than the second charge amount.

8. The method of claim 1, wherein determining if the first device has the relationship with the second device further comprises determining whether the first device is classified as a special user.

9. The method of claim 8, wherein the special user is one of a preferred contact, an authorized public information promulgator, or an emergency system broadcaster.

10. At least one processor configured to determine a charge for a communication with one or more devices, comprising:
    a first module for identifying a communication from a first device to a second device;
    a second module for determining if the first device has a relationship with the second device by identifying another communication between the first device and the second device prior to the time of the communication, wherein determining if the first device has the relationship with the second device further comprises determining whether the relationship is established within a configurable time period from a time of the communication;
    a third module for applying a first charge amount for the communication if the relationship is determined; and
    a fourth module for applying a second charge amount for the communication if the relationship is not determined; wherein
    applying the first charge amount for the communication if the relationship is determined further comprises initially applying an initial charge amount and subsequently applying an adjustment amount after the relationship is determined, wherein the first charge amount is less than the second charge amount.

11. A computer program product for determining a charge for a communication with one or more devices, comprising:
    a non-transitory computer-readable medium comprising:
    at least one instruction executable by the computer to identify a communication from a first device to a second device;
    at least one instruction executable by the computer to determine if the first device has a relationship with the second device by identifying another communication between the first device and the second device prior to the time of the communication, wherein to determine if the first device has the relationship with the second device further comprises determining whether the relationship is established within a configurable time period from a time of the communication;
    at least one instruction executable by the computer to apply a first charge amount for the communication if the relationship is determined; and
    at least one instruction executable by the computer to apply a second charge amount for the communication if the relationship is not determined; wherein
    applying the first charge amount for the communication if the relationship is determined further comprises initially applying an initial charge amount and subsequently applying an adjustment amount after the relationship is determined, wherein the first charge amount is less than the second charge amount.

12. An apparatus, comprising:
    means for identifying a communication from a first device to a second device;
    means for determining if the first device has a relationship with the second device by identifying another communication between the first device and the second device prior to the time of the communication, wherein determining if the first device has the relationship with the second device further comprises determining whether the relationship is established within a configurable time period from a time of the communication;
    means for applying a first charge amount for the communication if the relationship is determined; and
    means for applying a second charge amount for the communication if the relationship is not determined; wherein
    applying the first charge amount for the communication if the relationship is determined further comprises initially applying an initial charge amount and subsequently applying an adjustment amount after the relationship is determined, wherein the first charge amount is less than the second charge amount.

13. An apparatus for determining a charge for a communication with one or more devices, comprising:
    a communication receiving component operable to identify a communication from a first device to a second device;
    a communication relationship determiner operable to determine if the first device has a relationship with the second device by identifying another communication between the first device and the second device prior to the time of the communication, wherein the communication relationship determiner is further operable to determine whether the relationship is established within a configurable time period from a time of the communication;

a billing component operable to apply a first charge amount for the communication if the relationship is determined; and the billing component operable further to apply a second charge amount for the communication if the relationship is not determined; wherein applying the first charge amount for the communication if the relationship is determined further comprises initially applying an initial charge amount and subsequently applying an adjustment amount after the relationship is determined, wherein the first charge amount is less than the second charge amount.

14. The apparatus of claim 13, wherein identifying the another communication is based upon communications stored on a connection list.

15. The apparatus of claim 14, further comprising a communication history data store operable to generate the connection list based upon communications that occur over the network.

16. The apparatus of claim 13, wherein identifying the another communication further comprises at least one of identifying a response from the second device to the first device, or identifying an origination by the second device to the first device.

17. The apparatus of claim 13, wherein identifying the another communication further comprises searching billing records corresponding to at least one of the first device or the second device to identify the another communication.

18. The apparatus of claim 13, wherein initially applying the initial charge amount further comprises initially applying the second charge amount.

19. The apparatus of claim 13, wherein the first charge amount is less than the second charge amount.

20. The apparatus of claim 13, wherein the communication relationship determiner is further operable to determine whether the first device is classified as a special user.

21. The apparatus of claim 20, wherein the special user is one of a preferred contact, an authorized public information promulgator, or an emergency system broadcaster.

22. A method for receiving a charge at a wireless device for sending a communication to a second device, the method comprising:

sending a communication from a wireless device to a second device;

receiving a first charge for sending the communication if a relationship exists between the wireless device and the second device, wherein the relationship is determined by identifying whether another communication occurred between the wireless device and the second device prior to sending the communication, wherein determining the relationship further comprises determining whether the relationship is established within a configurable time period from a time of the communication; and receiving a second charge for sending the communication if a relationship does not exists between the wireless device and the second device, wherein the relationship is determined by identifying whether another communication occurred between the wireless device and the second device prior to sending the communication; wherein applying the first charge amount further comprises initially applying an initial charge amount and subsequently applying an adjustment amount after the relationship is determined, wherein the first charge amount is less than the second charge amount.

23. The method of claim 22, wherein initially applying the initial charge amount further comprises initially applying the second charge amount.

24. The method of claim 22, wherein the first charge amount is less than the second charge amount.

25. At least one processor configured to receive a charge at a wireless device for sending a communication to a second device, comprising:

a first module for sending a communication from a wireless device to a second device;

a second module for receiving a first charge for sending the communication if a relationship exists between the wireless device and the second device, wherein the relationship is determined by identifying whether another communication occurred between the wireless device and the second device prior to sending the communication, wherein determining if the first device has the relationship with the second device further comprises determining whether the relationship is established within a configurable time period from a time of the communication; and a third module for receiving a second charge for sending the communication if a relationship does not exists between the wireless device and the second device, wherein the relationship is determined by identifying whether another communication occurred between the wireless device and the second device prior to sending the communication; wherein receiving the first charge amount for the communication if the relationship is determined further comprises initially receiving an initial charge amount and subsequently receiving an adjustment amount after the relationship is determined, wherein the first charge amount is less than the second charge amount.

26. A computer program product for receiving a charge at a wireless device for sending a communication to a second device, comprising:

a non-transitory computer-readable medium comprising:

at least a first instruction executable by the computer to send a communication from a wireless device to a second device;

at least a second instruction executable by the computer to receive a first charge for sending the communication if a relationship exists between the wireless device and the second device, wherein the relationship is determined by identifying whether another communication occurred between the wireless device and the second device prior to sending the communication, wherein determining if the first device has the relationship with the second device further comprises determining whether the relationship is established within a configurable time period from a time of the communication; and at least a third instruction executable by the computer to receive a second charge for sending the communication if a relationship does not exists between the wireless device and the second device, wherein the relationship is determined by identifying whether another communication occurred between the wireless device and the second device prior to sending the communication; wherein receiving the first charge amount for the communication if the relationship is determined further comprises initially receiving an initial charge amount and subsequently receiving an adjustment amount after the relationship is determined, wherein the first charge amount is less than the second charge amount.

27. An apparatus comprising:
- means for sending a communication from a wireless device to a second device;
- means for receiving a first charge for sending the communication if a relationship exists between the wireless device and the second device, wherein the relationship is determined by identifying whether another communication occurred between the wireless device and the second device prior to sending the communication, wherein determining if the first device has the relationship with the second device further comprises determining whether the relationship is established within a configurable time period from a time of the communication; and
- means for receiving a second charge for sending the communication if a relationship does not exists between the wireless device and the second device, wherein the relationship is determined by identifying whether another communication occurred between the wireless device and the second device prior to sending the communication; wherein
- receiving the first charge amount for the communication if the relationship is determined further comprises initially receiving an initial charge amount and subsequently receiving an adjustment amount after the relationship is determined, wherein the first charge amount is less than the second charge amount.

28. An apparatus for receiving a charge at a wireless device for sending a communication to a second device, the apparatus comprising:
- a communication request component operable to send a communication from a wireless device to a second device;
- the communication request component is further operable to receive a first charge for sending the communication if a relationship exists between the wireless device and the second device, wherein the relationship is determined by identifying whether another communication occurred between the wireless device and the second device prior to sending the communication, wherein determining the relationship further comprises determining whether the relationship is established within a configurable time period from a time of the communication; and
- the communication request component is further operable to receive a second charge for sending the communication if a relationship does not exists between the wireless device and the second device, wherein the relationship is determined by identifying whether another communication occurred between the wireless device and the second device prior to sending the communication; wherein
- applying the first charge amount further comprises initially applying an initial charge amount and subsequently applying an adjustment amount after the relationship is determined, wherein the first charge amount is less than the second charge amount.

29. The apparatus of claim 28, wherein initially applying the initial charge amount further comprises initially applying the second charge amount.

30. The apparatus of claim 28, wherein the first charge amount is less than the second charge amount.

31. The method of claim 1, wherein determining whether the relationship is established within the configurable time period further comprises determining whether the second device sends a subsequent communication to the first device within the configurable time period.

32. The method of claim 31, wherein the subsequent communication comprises at least one of answering an interactive communication from the first device, or initiating communication by the second device to the first device.

33. The method of claim 1, wherein determining whether the relationship is established within the configurable time period further comprises the second device adding the first device to a contact list of the second device within the configurable time period.

34. The apparatus of claim 13, wherein the communication relationship determiner is further operable to determine whether the second device sends a subsequent communication to the first device within the configurable time period to determine whether the relationship is established within the configurable time period.

35. The apparatus of claim 34, wherein the subsequent communication comprises at least one of answering an interactive communication from the first device, or initiating communication by the second device to the first device.

36. The apparatus of claim 13, wherein the communication relationship determiner is further operable to determine whether the second device adding the first device to a contact list of the second device within the configurable time period to determine whether the relationship is established within the configurable time period.

37. The method of claim 22, wherein determining whether the relationship is established within the configurable time period further comprises determining whether the second device sends a subsequent communication to the wireless device within the configurable time period.

38. The method of claim 37, wherein the subsequent communication comprises at least one of answering an interactive communication from the wireless device, or initiating communication by the second device to the wireless device.

39. The method of claim 22, wherein determining whether the relationship is established within the configurable time period further comprises the second device adding the wireless device to a contact list of the second device within the configurable time period.

40. The apparatus of claim 28, wherein determining whether the relationship is established within the configurable time period further comprises determining whether the second device sends a subsequent communication to the wireless device within the configurable time period.

41. The apparatus of claim 40, wherein the subsequent communication comprises at least one of answering an interactive communication from the wireless device, or initiating communication by the second device to the wireless device.

42. The apparatus of claim 28, wherein determining whether the relationship is established within the configurable time period further comprises the second device adding the wireless device to a contact list of the second device within the configurable time period.

* * * * *